United States Patent [19]
Gal et al.

[11] Patent Number: 4,713,156
[45] Date of Patent: Dec. 15, 1987

[54] PROCESS FOR REGULATING AN ELECTRO-DIALYZER AND IMPROVED ELECTRODIALYSIS APPARATUS

[76] Inventors: Jean-Yves Gal, 75 impasse du Dragon, Le Clos Saint Georges, 34000 Montpellier; Jean-Michel Chiapello, 4 rue Castel Moton, 34000 Montpellier; Martial Peyrot, 87 avenue de la Révolution; Etienné Tourneux, 87 rue Pierre Brossolette, both of 87000 Limoges, all of France

[21] Appl. No.: 283
[22] Filed: Jan. 2, 1987

[30] Foreign Application Priority Data

Jan. 2, 1986 [FR] France .................. 86 00072

[51] Int. Cl.$^4$ .................. B01D 13/02; C02F 1/46
[52] U.S. Cl. .................. 204/182.4; 204/301; 204/151; 204/DIG. 13
[58] Field of Search .................. 204/182.4, DIG. 13, 204/151, 149, 130, 301, 232, 233, 234, 235, 236, 237, 238, 239, 240, 182.3, 180.1, 52.5, 55.3, 46.1, 182.5, 182.6

[56] References Cited

U.S. PATENT DOCUMENTS

| | | | |
|---|---|---|---|
| 3,847,765 | 11/1974 | Uno et al. | 204/151 |
| 4,179,348 | 12/1979 | Bernat | 204/182.4 X |
| 4,210,530 | 7/1980 | Etzel et al. | 210/668 |
| 4,652,351 | 3/1987 | Vaughan | 204/130 X |

OTHER PUBLICATIONS

Bodamer, George W., "Electrodialysis for Closed Loop Control of Cyanide Rinse Waters", U.S., NTIS, PB Rep., PB-272688, (1977).
Shiio, Hazime and Yamasuchi, Masami, "Use of Ion Exchange Membranes for Recovering Electroplating Zinc Cyanide Baths", Nogoya-Shi Kogyo Kenkyusho Kenkyu Hokoku, 54, 9-12, (1975).
Ozerov, A. I. et al., "Automatic Monitoring of Copper Cyanide in Waste Water During Ion Exchange and Electrodialysis Purification", Primenonie Sorbentov v Bsvet. Metallurgii, 173-177 from: Ref. Zh., Metall, 1974, Abstr. No. 11G405, (1973).
Shivrin, G. N. et al., "Electrodialysis of Industrial Cyanide Solutions and Slurries", Tsvet. Metal., 43(1), 89-93, (1970).
Hasegawa, Isao et al., "Electrodialytic Concentration of Cyano Complexes of Copper (I) in Waste Water from Copper Plating Bath by Electrolytic Cell with Ion Exchange Membranes", Kinzoku Hyomen Gijutsu, 33 (4), 408-413, (1982).
Tuwiner, S. B., "Zero Discharge of Cyanide Copper/Zinc Plating Solutions by the TU-WIN Process", Proc. Natl. Conf. Complete Water Reuse, 2nd, Meeting Date 1975, 276-281, (1976).

*Primary Examiner*—John F. Niebling
*Assistant Examiner*—John S. Starsiak, Jr.
*Attorney, Agent, or Firm*—Harold H. Dutton, Jr.

[57] ABSTRACT

A process and apparatus for regulating an electrodialyzer having a stack of ion-exchange membranes (2, 3) immersed in an electric field, and including sampling the dilute solution at the discharge (6), measuring in a cell (12) the content of a predetermined ion substance of this sample, in particular the content of free cyanide, and driving by means of a processing unit (14) a pump (15) as a function of that content so as to add a solution containing the ion substances (free cyanides) in an amount inversely related to the measured content at the intake (5) of the electrodialyzer, thereby eliminating electrodialyzer shutdown and membrane clogging.

12 Claims, 2 Drawing Figures

PROCESS FOR REGULATING AN ELECTRO-DIALYZER AND IMPROVED ELECTRODIALYSIS APPARATUS

This invention relates to a process for regulating an electro-dialyzer. More particularly, the invention relates to a process for regulating an electrodialyzer of a metal cyanide bath. The invention also relates to an improved electrodialysis apparatus capable of carrying out the process in the case of cyanide baths or for application to other types of baths, in particular metal acid baths.

BACKGROUND AND OBJECTS OF THE INVENTION

Electrodialysis is a process comprising concentrating the salts of a solution by passage across a stack of membranes which alternatively exchange anions and cations and which are placed in an electric field. This process results in obtaining one concentrated solution and one dilute solution. The process is especially useful in the case of metal baths for making possible the recycling rinsing baths for parts which have been subjected to electrodeposition or electroplating (galvanoplastics). The process then allows concentrating the rinse baths to use them again later as electroplating baths. Such a process in practice offers three main advantages: recovery of raw materials from the rinse baths (exceeding 90% in the case of cyanide baths), reducing of wastes and thus reducing the extent of required depolluting equipment, and recycling of the rinse waters. The most important application of this kind of electrodialysis is the treatment of the metal cyanide baths which are the most often used in electrodeposition.

However the carrying out of electrodialysis on metal cyanide baths has brought to light a serious drawback by which considerably limits the diffusion. In effect, during the electrodialysis, there is frequently produced a blockage of the operation, with colmatage or clogging and risk of deterioration of the ion exchange membranes. Up to now, these phenomena have remained unexplained and there is no satisfactory solution for suppressing them.

The present invention proposes to furnish a process for regulation of electrodialysis, permitting avoidance of the phenomena of blocking or colmating of the membranes as mentioned above.

Accordingly the primary object of the present invention is to widely expand the applicability of the electrodialysis processes of metal cyanide baths so as to take full advantage of their specific advantages, in particular with regard to their very high efficiency when operating properly. In particular the invention applies to cyanide baths of metals of alloys of copper, silver, zinc, brass, etc.

Another object of the invention is to create in a more general manner an improved electrodialysis equipment ensuring the regulation of an electrodialyzer of the type comprising a stack of ion-exchange membranes, electrodes on either side of the stack, at least one inlet conduit for the bath to be treated, a discharge conduit for the concentrated solution and a discharge conduit for the dilute solution, for safeguarding the electrodialyzer against membrane blocking phenomena.

DESCRIPTION OF THE INVENTION

In accordance with the invention, the regulating process for an electrodialyzer of the above type, fed at its inlet with a cyanide metal bath, comprises measuring the free cyanide content of the dilute solution at the discharge of the electrodialyzer and in adding to the cyanide bath at the intake of the electrodialyzer a cyanide solution containing free cyanide in a quantity as a function of the inverse of the measured content.

The inventors have shown that the composition of the solutions at the discharge, as a rule, changes during electrodialysis, and the analyses that were carried out have shown that the cyanide complexes contained in these solutions were not the same at different times: several types of complexes more or less loaded in cyanide have thus been shown to be present, in particular $M(CN)_4^{-3}$, $M(CN)_3^{-2}$ and $M(CN)_2^{-}$ for the case where the metal M is silver or copper. The nature of these complexes may change in the dilute solution until complexes form that hold little cyanide and which are insoluble (MCN in the above example) and even until metal hydroxides are obtained. Moreover the inventors have been able to observe that the clogging of the membrane surprisingly took place on the side of the dilute solution. By contrasting the two above facts, it was deduced that it was these insoluble species which produced the clogging of the membranes and the blocking of the operation. A study, both theoretical and experimental, has shown that the insoluble complexes were formed by a deficiency of free cyanide at the intake bath.

Accordingly the procedure of the invention comprises in adding cyanides to the intake bath the moment there appears a danger of forming insoluble complexes in order to maintain the conditions of having solely soluble complexes.

In certain cases, in electroforming, the metal concentration in the cyanide baths to be treated varies little, remaining close to a specific value. In that case the procedure of the invention can be implemented by first determining, for the metal concentration of the particular bath, a free cyanide content threshold above the limiting content corresponding to the solubility limit of the metal cyanides and metal hydroxides, and by adding to the cyanide bath to be treated the cyanide solution when the measured content becomes equal to or drops below the predetermined threshold.

The above threshold is determined so as to ensure that the solubility limit is not exceeded in the immediate vicinity of the membranes, taking into account the concentration gradient present in the diffusion layer.

In practice the threshold percentage can be determined once and for all by testing a sample bath with a concentration corresponding to that of the bath to be treated, whereby the content in free cyanide is determined from the sudden drop in efficiency of the electrodialyzer and by selecting a threshold with a content of the determined content plus a safety margin.

In other cases, the cyanide bath to be treated has a time-variable metal concentration. This is especially the case in electroforming when the parts are mass-plated at variable frequencies. In this case the process of the invention can be implemented by previously ascertaining the variation against conductivity of a threshold of free cyanide content above the limit content corresponding to the solubility limit of the metal cyanides and metal hydroxides, by measuring the bath conductivity at the dilute discharge of the electrodialyzer and by adding the cyanide solution to the cyanide bath when the measured content becomes equal to, or drops below the threshold corresponding to the measured conductivity value.

In the same manner as previously, it is thus assured that in the immediate vicinity of the membranes, the solubility limit is not exceeded in the diffusion layer, whatever may be the initial concentration of the bath in metal.

In practice, the curve of the content-threshold can be obtained from sample baths with staggered concentration, each test comprising measuring the bath conductivity and in ascertaining the free-cyanide content at which the electrodialyzer efficiency begins to drop abruptly, the content-threshold selected being this ascertained value plus a safety margin.

It should be noted that the procedure of the invention can also be carried out under the conditions of the first case above for baths with variable metal concentration. In that event it is sufficient to determine the threshold content by assuming the bath to be at the highest actual metal concentration (most adverse case). This embodiment leads to adding excessive cyanides but also to more easily handled equipment.

In another feature of the process, the content in free cyanide of the dilute solution is measured continuously or periodically and a continuous flow of cyanide solution is controlled into the bath to be treated when the measured content drops below the threshold content, and this injection ceases when this measured content moves above this threshold. Such an embodiment results in a very simple go/no-go control.

In a preferred embodiment, the content in free cyanide is measured by tapping a flow of dilute solution, making it circulate in a cell containing a specific electrode for the free cyanide and a reference electrode, and measuring the electric signal between the two electrodes and representing the pCN$^-$. The pCN$^-$ is an inverse function of the free cyanide content (the colog of this content) and reflects this content: for a given metal concentration, the added quantity of cyanide solution is a direct function of the pCN$^-$. In particular the specific electrode may be a polycrystalline electrode of the type PCN 211 made by TACUSSEL COMPANY. The circulation cells used in this measurement are known per se and in particular may be the CCES 2 type from the same firm.

It was observed that the measurement is affected by the ionic strength of the solution and fluctuations in it may lead to errors. To overcome this drawback, another feature of the invention provides for mixing into the dilute-solution flow, a buffer solution with an ionic strength such that the mixture shall have an essentially constant ionic strength much above that of the dilute solution.

Advantageously the added cyanide solution is a solution of potassium or sodium cyanide.

The invention further covers improved electrodialysis apparatus which in particular allows implementing the above defined procedure for cyanide metal baths. This equipment comprises an electrodialyzer of the type mentioned above and includes: sampling means connected to the discharge conduit of the dilute solution, a voltage or current measuring cell supplied by the sampling means and designed to emit a measurement signal which is a function of the content of a predetermined ion substance of the dilute solution, a processing unit for the measurement signal emitted by the cell to form a control signal, a reservoir for a solution containing the above ion substances, a circuit feeding the reservoir solution to the electrodialyzer intake and having a pump driven by the control signal from the above processing unit.

In another feature of the apparatus, these means are advantageously supplemented by test apparatus for the bath conductivity at the discharge of the dilute solution, the processing unit receiving the conductivity signal emitted by the test apparatus and being programmable and designed to transmit a control signal which is a function of the measurement signal from the cell and of the conductivity signal.

DESCRIPTION OF THE DRAWINGS

The following description relates to the attached drawings which schematically show one embodiment of electrodialyzing equipment of the invention and provides examples of implementation of the procedure of the invention.

DESCRIPTION OF PREFERRED EMBODIMENTS

Figure 1:
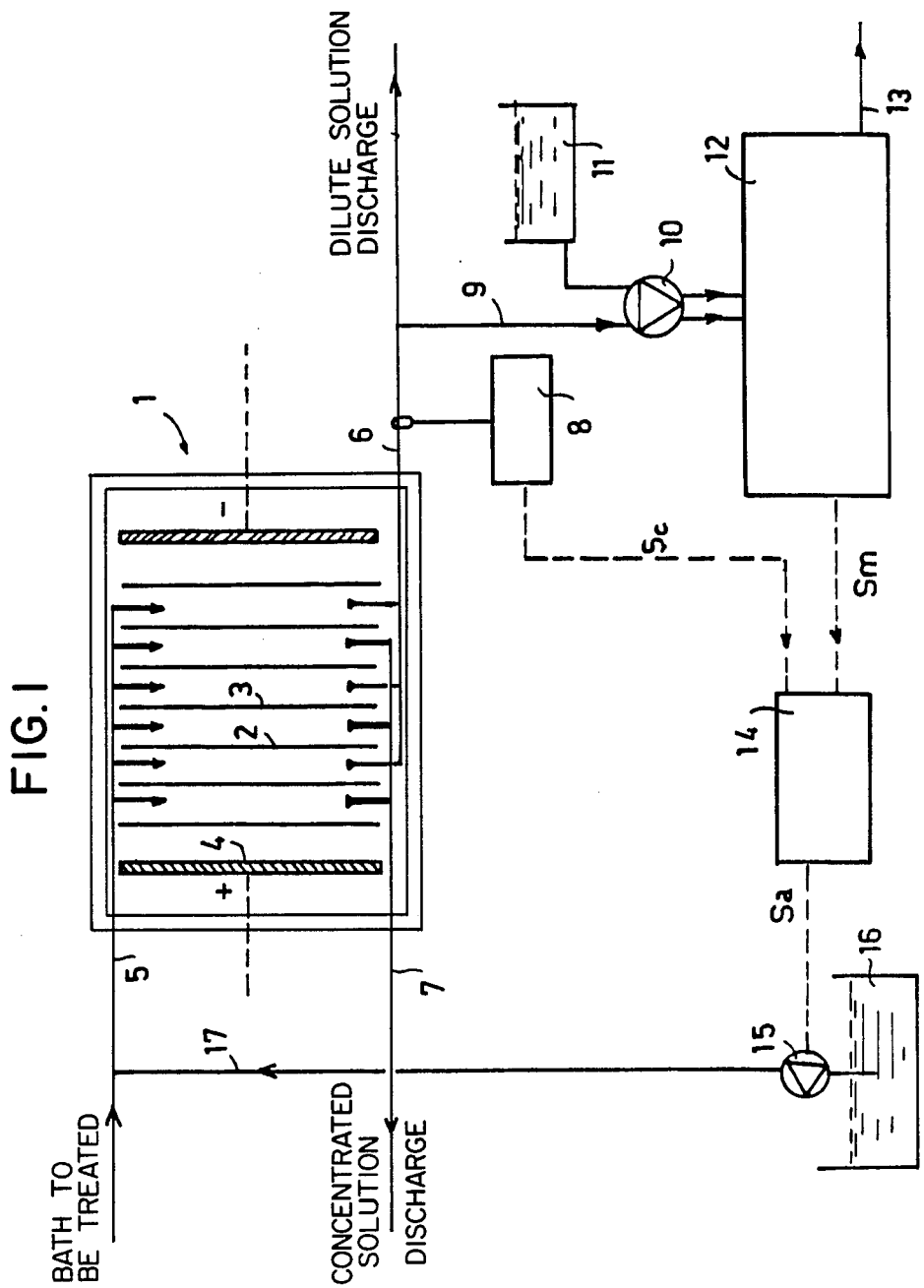
FIG. 1 is a schematic view of the apparatus.

The improved electrodialyzing equipment shown in FIG. 1 comprises an electrodialyzer 1 of a conventional type with sheet-flow and having a stack of membranes which are alternating cation-exchangers 2 and anion exchangers 3 and are subjected to an electric field generated by the electrodes 4. The bath to be treated is injected through a conduit 5 into the electrodialyzing cells; the dilute solution is collected in a conduit 6 and the concentrated solution is collected in a conduit 7.

A conductivity testing apparatus 8 is connected to the discharge of the dilute solution 6. This apparatus is conventional and comprises a probe in the discharge conduit 6, and continuously feeds a signal $S_c$ reflecting the conductivity of the dilute solution.

A slight flow is tapped at the discharge of the dilute solution 6 by a conduit 9 due to a two way peristaltic pump 10. This pump also taps an ionic strength buffer solution from a reservoir 11. In the Examples, this is a solution of concentrated sodium nitrate which does not affect the pH of the dilute solution tapped by the conduit 9.

The solutions are fed into a circulating cell 12 of the TACUSSEL CCES 2 type. The cell includes in conventional manner a magnetic stirrer, an electrode specific to the ion substance in question (TACUSSEL PCN 2 M electrode for cyanide), a reference electrode, particularly of mercury sulfate, and means for measuring the electric signal between the electrodes, in particular a millivoltmeter delivering a measurement signal $S_m$ representing the free ion content in question. In the case of cyanide, this signal is directly proportional to the pCN$^-$. The cell 12 furthermore includes a discharge conduit 13 for the slight tapped flow.

The signals $S_c$ and $S_m$ are transmitted to a processing unit 14 comprising in this example a programmed microprocessor emitting a control signal $S_a$ to an peristaltic pump 15. The control of the pump 15 is go/no-go as a function of the signal $S_a$. As will be seen further below, the signal $S_a$ is obtained from the signals $S_c$ and $S_m$ by comparing with a programmed function $f(S_m, S_c)$.

The pump 15 taps a flow from the reservoir 16 containing a solution of potassium or sodium cyanide. It forces this solution into a conduit 17 connected to the intake conduit 5 of the bath to be treated.

The examples below illustrate the procedure of the invention carried out by the above equipment for the case of a copper cyanide bath.

EXAMPLE 1

In this Example, the bath to be treated is a bath of copper cyanide having an essentially constant molar concentration of copper of $4 \times 10^{-2}$M.

During a first stage, the pump is shut down to eliminate adding cyanide through the conduit 17. The operational conditions are as follows:

200 anionic membranes of the "ASAHI" type
200 similar cationic membranes
intake flow: 14 m³/h
flow of dilute solution: 7 m³/h
flow of concentrated solution: 7 m³/h
relative pressure at the dilute discharge: 0.8 bars
relative pressure at concentrated discharge: 0.8 bars
potential difference at the electrodes (4): 170 v
flow tapped by the conduit (9): $16 \times 10^{-5}$ m³/h The efficiency expressed as metal collected from the concentrated solution relative to the initial metal in the bath to be treated stays close to 97% for 1 h and then drops abruptly to 92%. The pCN$^-$ value (from the $S_m$ signal) increases during this time and reaches the value of 1.6. The drop in efficiency then is accompanied by a drop in the flow of 36%. A deposit forms on the membranes and clogging them requires disassembling and washing the stack.

The pCN$^-$ corresponding to the solubility limit therefore is about 1.6 and a practical threshold not to be exceeded is selected at 1.25.

This threshold is programmed into the unit 14 so that it transmits a signal $S_a$ to start up the pump 15 when the signal $S_m$ exceeds this threshold, and to stop it when again the signal $S_a$ becomes less than this threshold. (In this example, the $S_c$ signal is not used).

The experiment is run again while the pump 15 is operating and under the same conditions as before.

The pump is started up after about 30 minutes. The flow of solution forced through the conduit 15 was 2 l/h, the concentration of the sodium cyanide solution being 300 g/l.

The electrodialyzer operated in this manner a full day without a drop in efficiency and without clogging (the efficiency having remained constant at about 97%), the pump 15 being started up and shut down many times.

EXAMPLE 2

In this Example, the copper concentration in the bath to be treated was caused to vary, the operating conditions being similar to those of Example 1.

Figure 2:
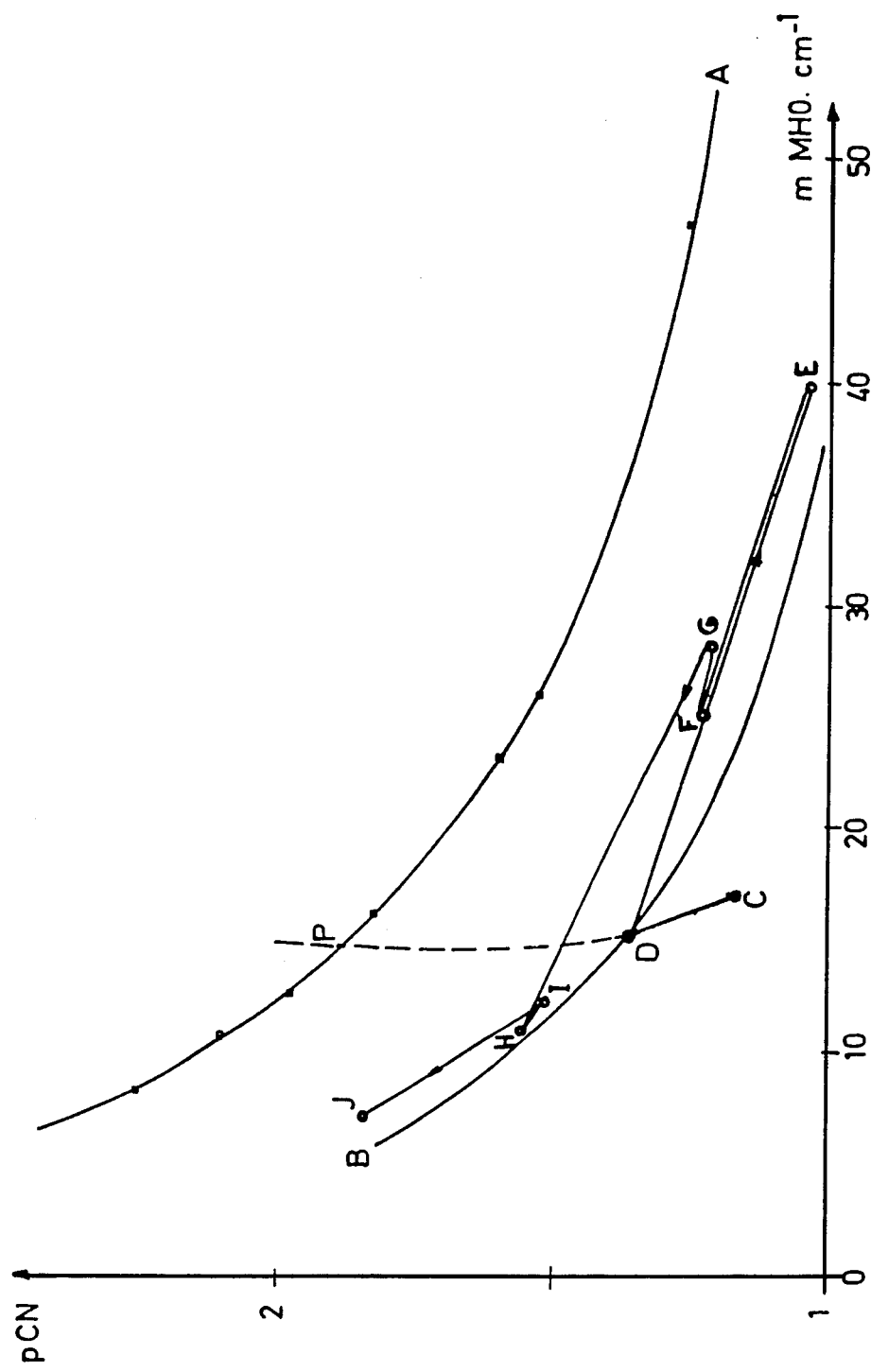
FIG. 2 is a graph obtained from cyanide copper bath.

In a first stage, the pump 15 was shut down and the curves A and B of the graph of FIG. 2 providing the pCN as a function of conductivity (function of the bath metal concentration) were obtained point-wise (seven experimental points each obtained as previously).

Curve A is approximate because the onset of the efficiency drop is not well defined. Curve B is deduced from curve A with a safety margin of about 0.4 units of pCN.

The threshold function $f(S_m, S_a)$ is recorded in the processing unit so that for a given value of $S_c$, this unit will transmit a pump start-up signal when the $S_m$ signal exceeds the threshold set by the function.

The implementation of the procedure itself then is carried out by the pump 15 in the operating state by providing cycles which raise and lower the metal concentration in the bath to be treated within a molar range of about $10^{-2}$M to $4 \times 10^{-2}$M (this being a practical range encompassing the variation of the copper concentration in the rinse baths used in electro-forming).

Operation with repeated pump start-up and shut-down lasted a full day and the efficiency remained above 96%.

The line C-D-E-F-G-H-I-J schematically indicated in FIG. 2 illustrates the system behavior from an operational onset C: the drop in the conductivity and the increase in pCN shift the system to point D where the pump starts up. Thereafter the system moves about the curve B due to the corrections in the pCN (the path is a function of the variations in metal concentration of the bath to be treated). The dashed lines show the change in the system where the cyanide addition will not take place: rapid clogging takes place at point P.

While this invention has been described as having certain variations and modifications, it will be understood that it is capable of still further modification without departing from the spirit of the invention, and this application is intended to cover any and all variations, modifications and adaptations of the invention as fall within the spirit of the invention and the scope of the appended claims.

We claim:

1. A process for regulating the electrodialysis of a cyanide metal bath having a stack of ion exchange membranes in an electric field, an intake for the cyanide bath to be treated, a discharge for the concentrated solution and a discharge for the dilute solution, the process comprising measuring the content of free cyanide in the dilute solution at said discharge and adding to the cyanide bath at said intake a solution of cyanide containing free cyanide ions as an inverse function of the measured content.

2. A process as in claim 1 for regulating the electrodialysis of a cyanide bath having an essentially constant metal ion concentration, and including determining a threshold content of free cyanide for the metal concentration of the particular bath, said threshold being above a limit content corresponding to the limit of solubility of the metal cyanides and metal hydroxides, and adding the cyanide solution to the cyanide bath to be treated when the measured content becomes equal to or less than the predetermined threshold.

3. A process as in claim 2, and including determining said content threshold by testing a sample bath having a concentration corresponding to that of the bath to be treated and comprising determining the content in free cyanide beyond which the electrodialysis efficiency undergoes an abrupt drop and selecting a threshold content equal to this determined content plus a safety margin.

4. A process as in claim 1 for regulating an electrodialyzer supplied with a cyanide metal bath wherein the metal concentration changes with time, and including preliminarily determining the variation of threshold content of free cyanide above the limit content corresponding to the limit of solubility of the metal cyanides and metal hydroxides as a function of conductivity by measuring the bath conductivity at the dilute discharge of the electrodialyzer and adding the cyanide solution to the cyanide bath to be treated when the measured content becomes equal to or less than the threshold corresponding to the measured conductivity value.

5. A process as in claim 4, and including determining the variation curve of the threshold content by tests run on samples of staggered concentration, each test comprising measuring the bath conductivity and ascertaining the content of free cyanide beyond which the electrodialysis efficiency drops abruptly, and setting the content threshold equal to this ascertained content plus a safety margin.

6. A regulation process as in claim 1 and including carrying out a continuous or periodic measurement of the content of free cyanide in the dilute solution and causing the addition of a flow of cyanide solution into the bath to be treated when the measured content drops below the content threshold and stopping the addition when the measured content again exceeds said threshold.

7. A regulation process as in claim 6, and wherein the measurement of the content in free cyanide comprises tapping a flow of dilute solution, causing said flow to circulate in a cell containing an electrode specific to free cyanide and a reference electrode, and measuring the electric signal representing the pCN between said electrodes.

8. A regulation process as in claim 7, and including adding an ion strength buffer solution to the tapped flow of dilute solution and imparting to the mixture an essentially constant ionic strength much higher than that of the dilute solution.

9. A regulation process as in claim 1 and including adding a solution of potassium or of sodium cyanide.

10. An electrodialysis apparatus comprising an electrodialysis cell (1) having a stack of ion exchange membranes (2, 3), electrodes (4) located on both sides of said stack, at least one intake conduit (5) for a bath to be treated, a discharge conduit (7) for the concentrated solution and a discharge conduit (6) for the dilute solution, tapping means (9, 10) connected to the discharge conduit (6) for the dilute solution, a voltage or current measuring cell (12) supplied by said tapping means for emitting a measurement signal ($S_m$) which is a function of the content of a predetermined ion substance in the dilute solution, a processing unit (14) for said measurement signal from the cell (12) for emitting a control signal ($S_a$), a reservoir (16) for a solution containing said ion substance, a circuit (15, 17) feeding the solution in the reservoir (16) to said intake and comprising a pump (15) driven by the control signal ($S_a$) from the said processing unit (14).

11. An electrodialysis apparatus as in claim 10 and wherein said measuring cell (12) is connected to a reservoir (11) of an ionic strength buffer solution and includes an electrode specific to the said ion substance, a reference electrode and means for measuring the electric signal across said electrodes.

12. An electrodialysis apparatus as in claim 10 and including means (8) for measuring the conductivity of the bath at the discharge (6) of the dilute solution, said processing unit (145) receiving the conductivity signal ($S_c$) from said measuring means being programmable and designed to emit a control signal ($S_a$) as a function of the measuring signal ($S_m$) transmitted by the cell and of the conductivity signal ($S_c$).

* * * * *